(12) United States Patent
Staver et al.

(10) Patent No.: US 6,670,577 B2
(45) Date of Patent: Dec. 30, 2003

(54) LASER SHOCK PEENING METHOD AND APPARATUS

(75) Inventors: Phillip Randall Staver, Hagaman, NY (US); William Taylor Lotshaw, Bethesda, MD (US); Michael Francis X Gigliotti, Jr., Scotia, NY (US); Josef Robert Unternahrer, Lafayette, CO (US); Robert Snee Gilmore, Charlton, NY (US); Thomas James Batzinger, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 30 days.

(21) Appl. No.: 09/965,320

(22) Filed: Sep. 28, 2001

(65) Prior Publication Data

US 2003/0062350 A1 Apr. 3, 2003

(51) Int. Cl.⁷ .............................................. B23K 26/00
(52) U.S. Cl. ................................................. 219/121.85
(58) Field of Search ........................ 219/121.61, 121.62, 219/121.67, 121.68, 121.69, 121.72, 121.85

(56) References Cited

U.S. PATENT DOCUMENTS

| | | | | |
|---|---|---|---|---|
| 5,742,028 A | * | 4/1998 | Mannava et al. | |
| 5,756,965 A | * | 5/1998 | Mannava | |
| 5,911,891 A | * | 6/1999 | Dulaney et al. | |
| 5,932,120 A | * | 8/1999 | Mannava et al. | |
| 5,935,464 A | * | 8/1999 | Dulaney et al. | |
| 6,002,706 A | | 12/1999 | Staver et al. | ............... 372/108 |
| 6,005,219 A | * | 12/1999 | Rockstroh et al. | |
| 6,021,154 A | | 2/2000 | Unternahrer | ................ 372/108 |
| 6,108,357 A | * | 8/2000 | Unternahrer | |
| 6,144,012 A | * | 11/2000 | Dulaney et al. | |
| 6,197,133 B1 | * | 3/2001 | Unternahrer et al. | |

* cited by examiner

*Primary Examiner*—Samuel M. Heinrich
(74) *Attorney, Agent, or Firm*—Penny A. Clarke; Patrick K. Patnode

(57) ABSTRACT

A method for laser shock peening a surface is disclosed. A laser beam pulse from a laser apparatus is produced. The laser pulse has a cross-section taken perpendicular to the laser beam, a fluence profile across the cross-section. The pulse against an area on said surface. The fluence profile is controlled such that process induced defects are reduced.

33 Claims, 9 Drawing Sheets

LASER SHOCK PEENING METHOD AND APPARATUS

BACKGROUND OF THE INVENTION

The invention relates to an apparatus and method for laser shock peening. In order to strengthen or otherwise change the mechanical properties of certain materials, such as metals, metal alloys, and heterogeneous structures thereof, peening has been employed. One type of peening involves shot peening, wherein small balls are fired against a surface of a target workpiece to create plastic deformation and corresponding residual stress in the target workpiece. The residual compressive stress improves the useful fatigue strength and operational life of the workpiece.

It is also known to use laser shock peening in place of conventional shot peening. A laser, typically a high-energy solid state laser, is operated in pulse mode and pulses are directed against a workpiece surface. The pulses generate mechanical shock waves, which produce compressive residual stresses that are capable of enhancing the fatigue strength and fatigue life in metals or metal alloy parts or structures.

The function of these compressive residual stresses (i.e., from conventional shot peening or laser shock peening) is to stop crack propagation by the establishment of additional forces that must be overcome by tensile forces under normal or abnormal mechanical operational conditions. One exemplary application of laser shock peening is in the manufacture of fan blades for turbine devices.

In laser shock peening, the workpiece to be treated is typically covered with a sacrificial light absorbing coating, which is generally an ablative material (e.g., black paint or tape). The coating is covered by a thin layer of water. The laser is positioned so as to direct pulsed laser energy to the coated workpiece. Absorbed laser energy vaporizes (ablates) the coating in a small explosion that is inertially confined by the water to develop an instantaneous pressure pulse or high pressure mechanical shock wave that is directed into the workpiece. The shock wave causes plastic deformation of the workpiece surface and corresponding residual compressive stress within the underlying microstructure of the workpiece.

While the aforementioned apparatus and process benefits certain mechanical properties, unwanted side effects may occur. For example, comparisons of the microstructure of a workpiece before irradiation and after irradiation according to the process of laser peening have demonstrated microstructural faults at the mid-plane between the surfaces of the workpiece. One microstructural fault typically appears to be in the form of dislocations (ragged cracks or tears) in the microstructure of the workpiece. These microstructural defects are generally undesirable as they may reduce the fatigue strength and impact resistance of the workpiece in its intended application.

BRIEF SUMMARY OF THE INVENTION

A method for laser shock peening a surface is disclosed. A laser beam pulse from a laser apparatus is produced. The laser pulse has a cross-section taken perpendicular to the laser beam, a fluence profile across the cross-section. The pulse is directed against an area on said surface. The fluence profile is controlled such that process induced defects are minimized.

DETAILED DESCRIPTION OF THE INVENTION

The energy distribution of the laser beam, referred to as the spatial beam profile, affects the microstructural integrity of the target workpiece. The spatial beam profile variations from thermal steady-state to non steady-state for particular rod-geometry lasers can be utilized to minimize or eliminate dislocation defects such as those shown in FIGS. 6 and 7, described further herein. Furthermore, the spatial beam profile from any laser system may be manipulated, either by the laser system design or by modification of the beam profile, to avoid the induction of dislocation defects and control the distribution of process-induced residual stresses, which are the desired outcome of the shock-peening treatment.

Figure 1:
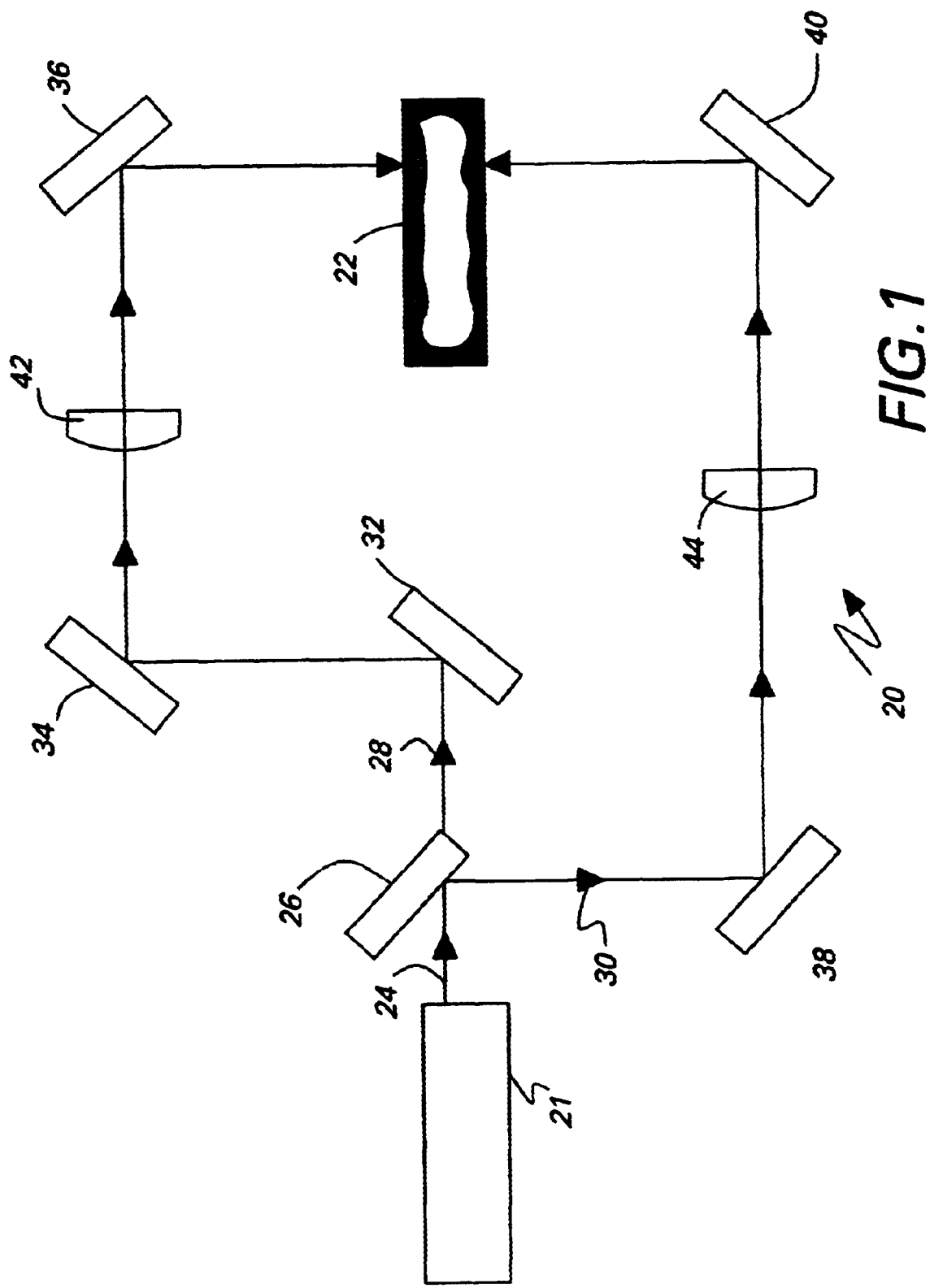
FIG. 1 is a schematic arrangement of a laser beam delivery system capable of laser shock peening a workpiece.

FIG. 1 represents a general schematic arrangement of a system 20 capable of irradiating both sides of a workpiece 22 by using a number of optical elements such as beam splitters, mirrors, lenses, etc. A laser 21 provides a laser output pulse 24, which is introduced to a beam splitter 26. Laser 21 may optionally be operatively coupled to one or more controllers or homogenizers for controlling beam generation, mode, profile, and other parameters and characteristics. Beam splitter 26 splits laser output 24 into a first beam 28 and a second beam 30. First beam 28 and second beam 30 are approximately of the same intensity due to the configuration of beam splitter 26. Through an arrangement of mirrors 32, 34, 36, 38 and 40, the first beam 28 and second beam 30 are directed to act upon workpiece 22. Additionally, lenses 42, 44 are provided to direct beams 28, 30, respectively, into a desired beam area to attain a desired laser fluence which exceeds a threshold established by the process physics. The instantaneous laser power (pulse energy/pulse duration) is generally about $0.5 \times 10^9$ Watts per squared centimeter ($W/cm^2$) to about $5 \times 10^9$ $W/cm^2$). The laser fluence satisfying these constraints results in fluence values of about 50 Joules per $cm^2$ ($J/cm^2$) and about 200 $J/cm^2$.

These fluence values and ranges may be altered by adoption of other instantaneous power and/or pulse width regimes.

Specifically, first beam 28 is reflected off of mirror 32, which directs beam 28 toward mirror 34. From mirror 34, beam 28 is directed through lens 42 to mirror 36, which then reflects beam 28 to workpiece 22. Simultaneously, second beam 30 is reflected off of mirror 38 through lens 44 to mirror 40, which then reflects beam 32 to the opposite side of workpiece 22.

Figure 2:
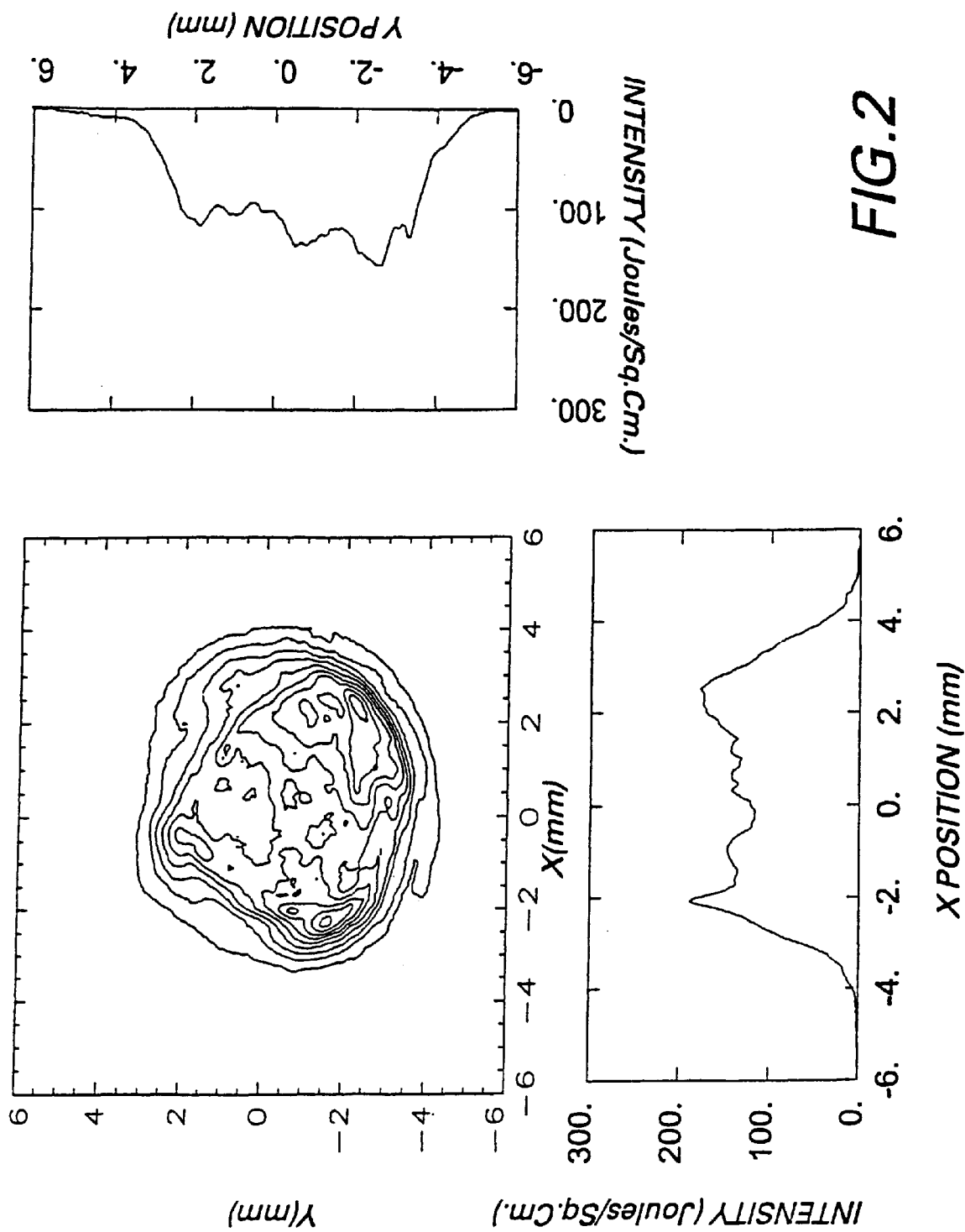
FIG. 2 is a spatial beam profile from one kind of rod-geometry laser.

FIG. 2 shows the spatial beam profile of a particular rod-geometry Neodymium:glass laser system. This profile, and others described herein, was measured with a Charge Coupled Device (CCD) camera positioned at an optical location suitable for monitoring the fluence distribution at the workpiece surface. This optical diagnostic is preferably capable of identifying changes within the actual spatial intensity profile. In one embodiment, this camera is located optically so that it records exactly the same intensity distribution that is applied to the target workpiece. Because the characteristics of the spatial intensity profile which are diagnostic of the potential induction of structural defects are the relative structure and symmetry of the energy distribution in the spatial beam profile, the camera can be located at any point along the laser beam path where these relative characteristics can be conveniently observed and which has a known relationship to the target plane distribution. Alternate imaging techniques capable of sampling the interior structure of a test sample, such as computed tomography (CT), may be used.

Figure 3:
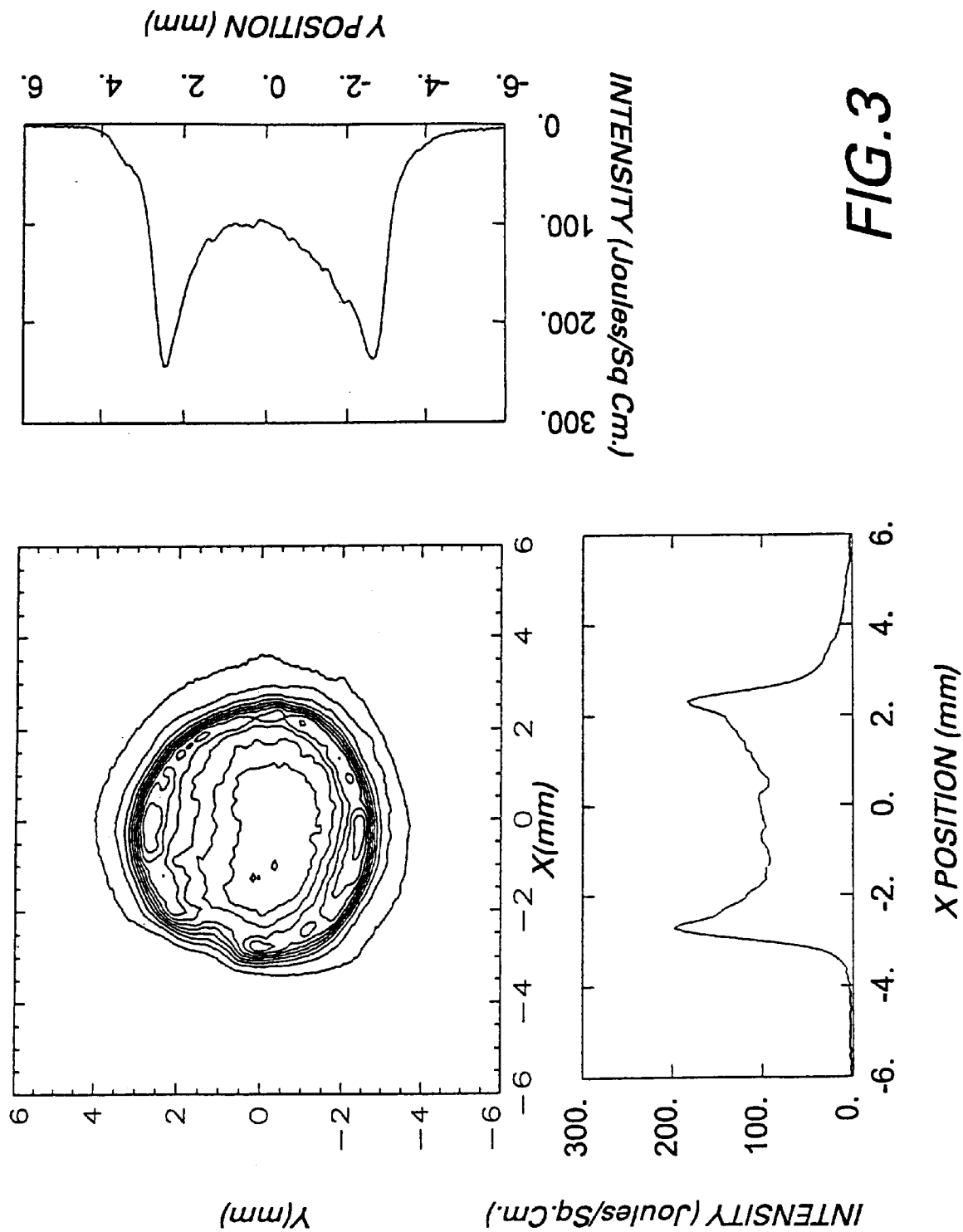
FIG. 3 is a spatial beam profile from a second kind of rod-geometry laser.

The profile of FIG. 2 shows a small degree of circular symmetry. The generally irregular shape represents the spatial beam profile employed using a prototypical rod-geometry laser. Referring now to FIG. 3, a spatial beam profile of a second type of rod-geometry is provided. The profile of FIG. 3 indicates a relatively high degree of circular symmetry.

The spatial beam profile of FIG. 3 is a profile taken of the first shot emitted from the laser system (i.e., the laser is not in thermal steady-state). The spatial beam profile of this second rod-geometry laser changes dramatically as the laser warms up and approaches the thermal steady-state.

Figure 4:
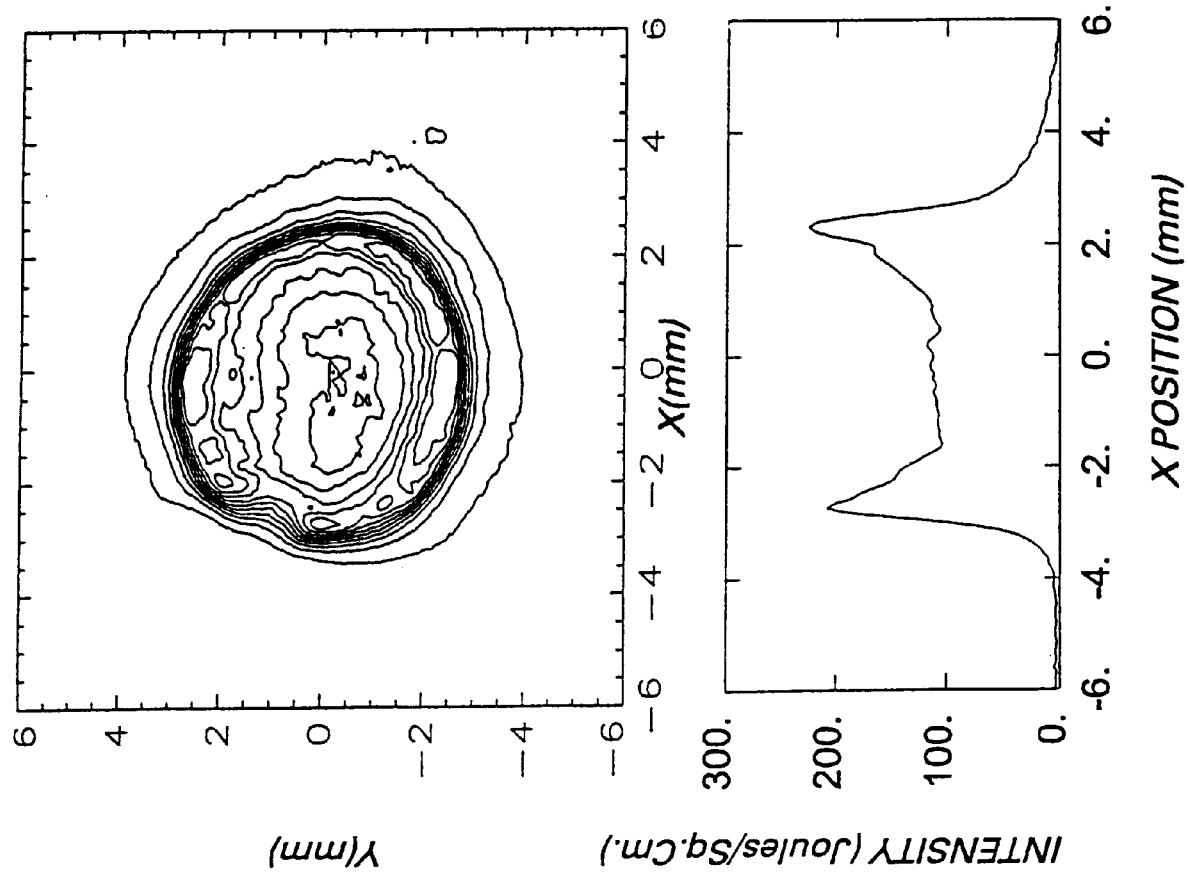
FIG. 4 is a spatial beam profile for the first shot of a sequence of shots from the second kind of rod-geometry laser.
Figure 5:
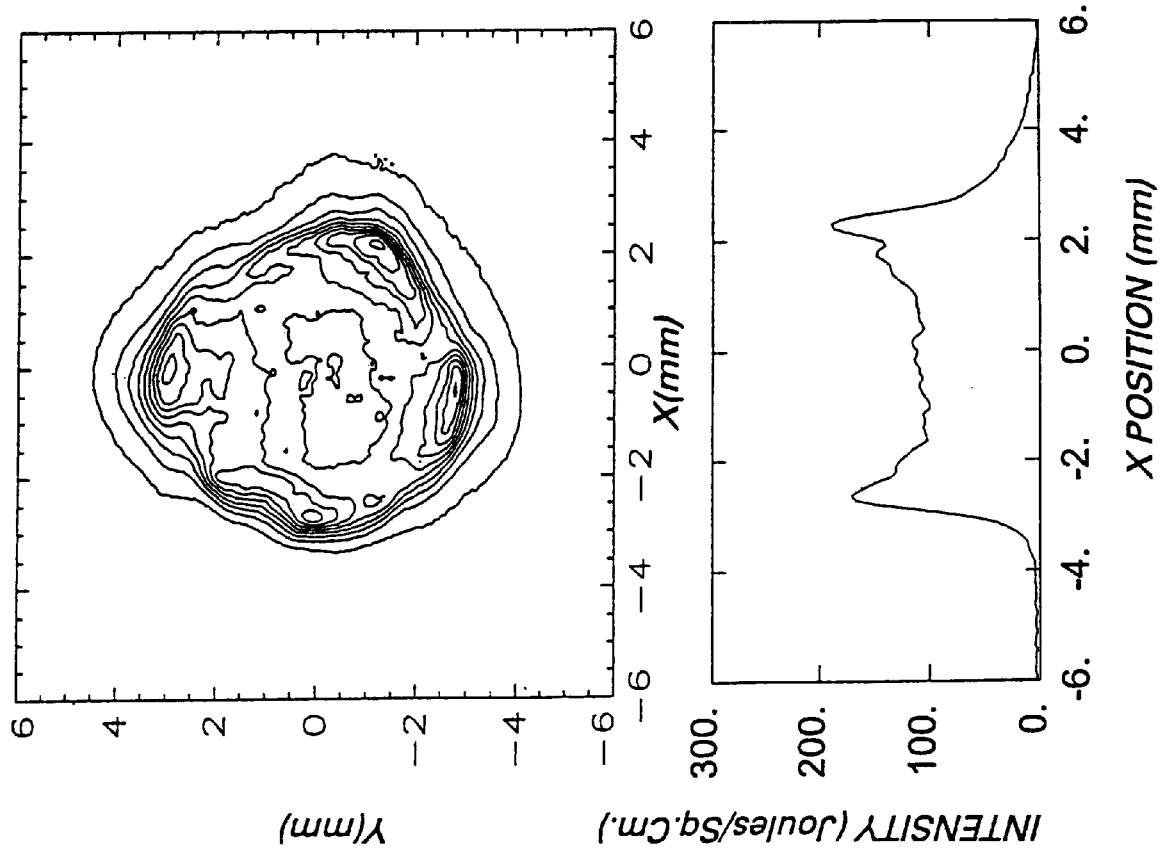
FIG. 5 is a spatial beam profile for the fifth shot of a sequence of shots from the second kind of rod-geometry laser.
Figure 6:
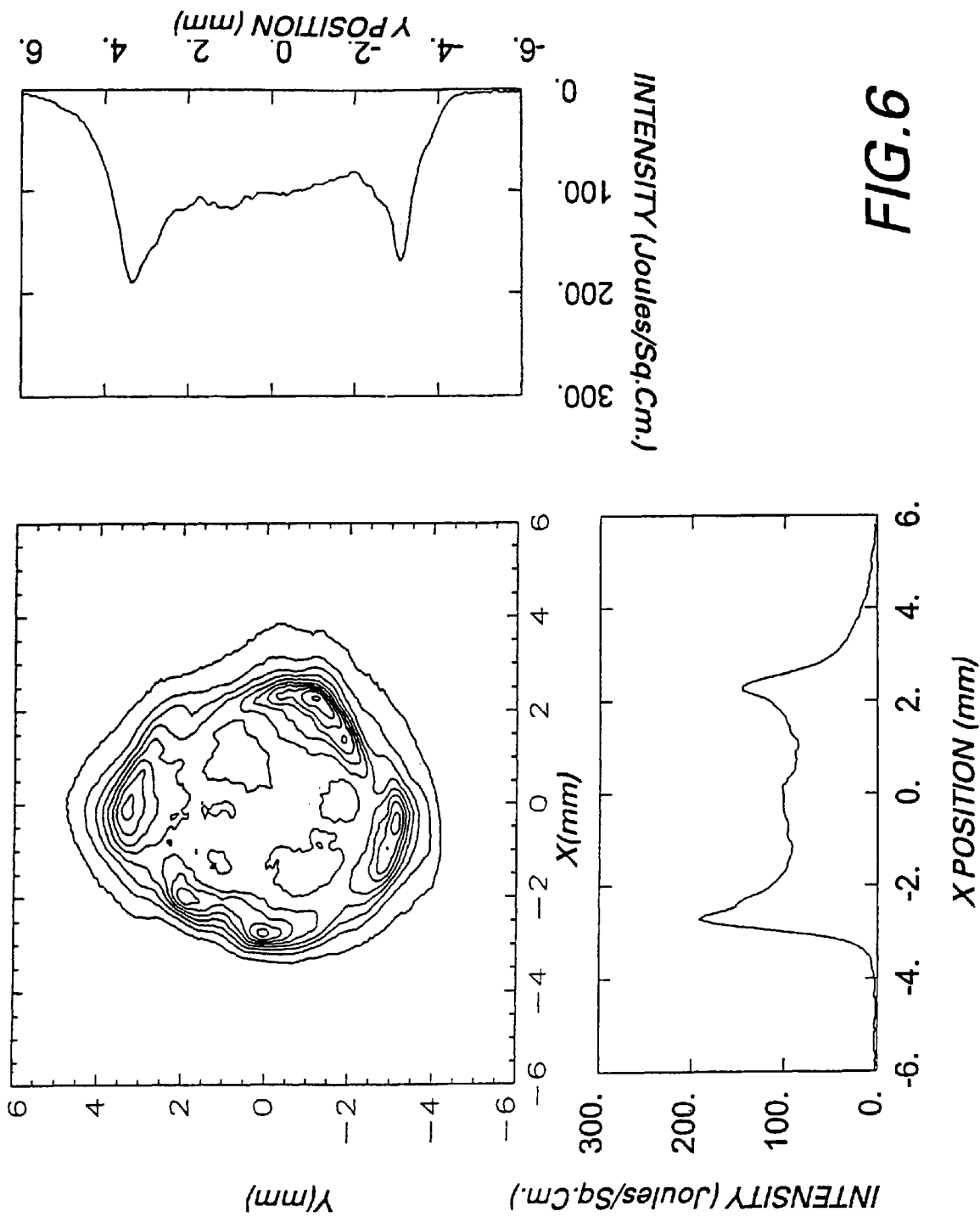
FIG. 6 is a spatial beam profile for the tenth shot of a sequence of shots from the second kind of rod-geometry laser.
Figure 7:
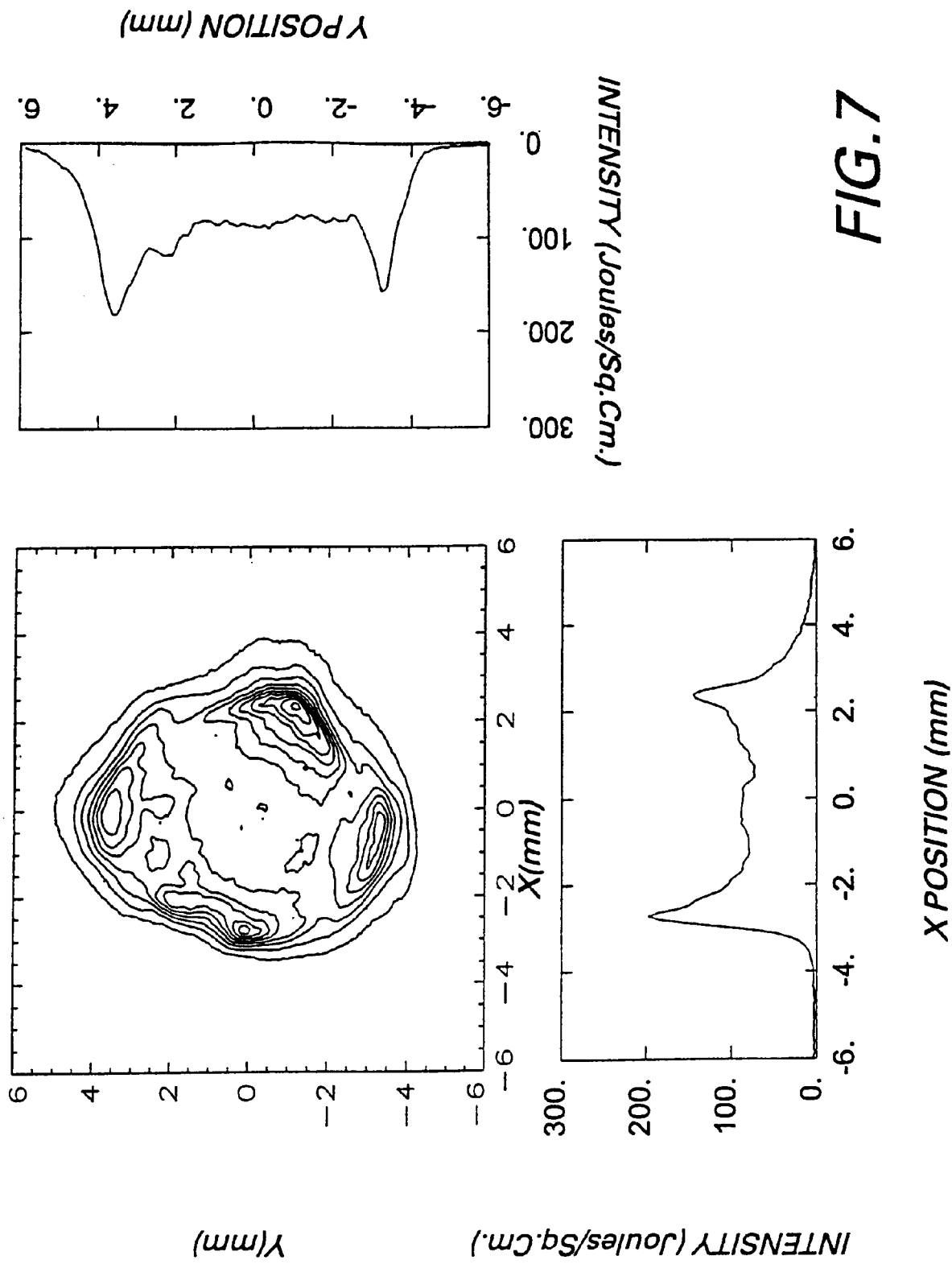
FIG. 7 is a spatial beam profile for the fifteenth shot of a sequence of shots from the second kind of rod-geometry laser.
Figure 8:
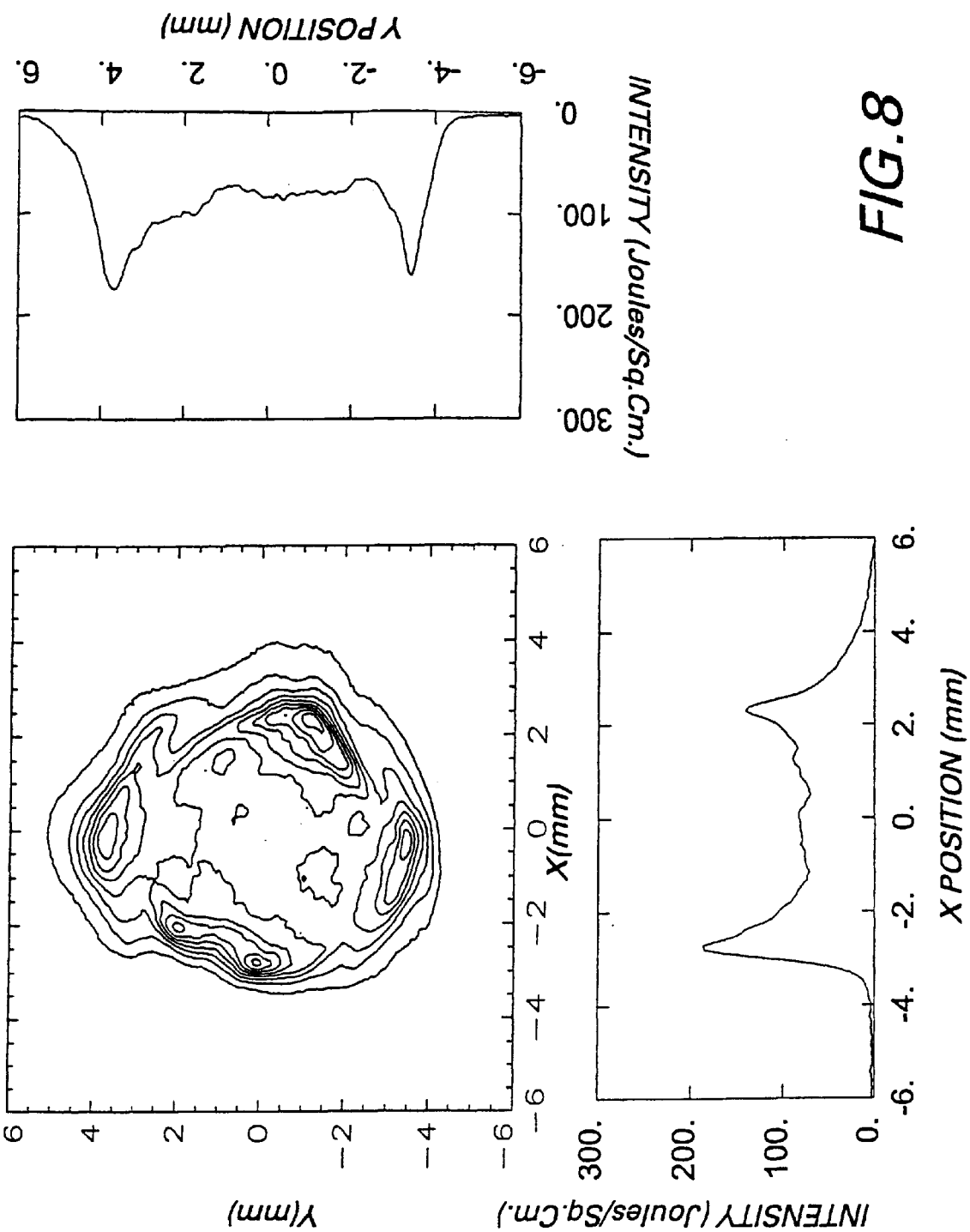
FIG. 8 is a spatial beam profile for the twentieth shot of a sequence of shots from the second kind of rod-geometry laser.

Referring now to FIGS. 4–8, spatial beam profiles of a sequence of shots during the laser warm-up cycle are displayed. FIG. 4 represents the first shot, FIG. 5 represents the fifth shot, FIG. 6 represents the tenth shot, FIG. 7 represents the fifteenth shot, and FIG. 8 represents the twentieth shot. As the laser approaches thermal steady-state the degree of annular segregation of energy in the spatial profile progressively decreases. According to one embodiment of the invention, shots similar to those represented in FIGS. 5–8 are for laser shock peening to reduce microstructural faults. According to another embodiment of the invention, shots similar to those represented in FIGS. 6–8 are used for laser shock peening. Additionally, according to another embodiment of the invention, shots similar to those represented in FIGS. 7–8 used for laser shock peening to reduce microstructural faults.

The shots of FIGS. 5–8 exhibit decreasing annular character, as evidenced by the reduction in the fluence at the annulus region of the shot in FIG. 4 as compared to the shots in FIGS. 5–6, and the substantial reduction as compared to the shots in FIGS. 7–8.

Generally, as the annular structure in the profiles of FIGS. 2–8 becomes more pronounced, the likelihood of induced microstructural faults (e.g., ruptures, tears, or cracks) within a target (e.g., a workpiece), and specifically at the mid-plane of the target, increases.

EXAMPLE 1

A more consistent spatial profile leads to a minimization of microstructural faults. The shot sequence shown in FIG. 4 was used to process target workpieces. The target workpieces were titanium alloy coupons each having a thickness of 2 millimeters. The coupons were covered with black electrical tape (3M 471 tape) and a thin layer of flowing water. The output energy of the laser device totaled 50 Joules. The laser beam area at the workpiece surface was adjusted (by the positions of lenses 42 and 44 in FIG. 1) to obtain a fluence of approximately 150 Joules/cm$^2$.

Figure 9:
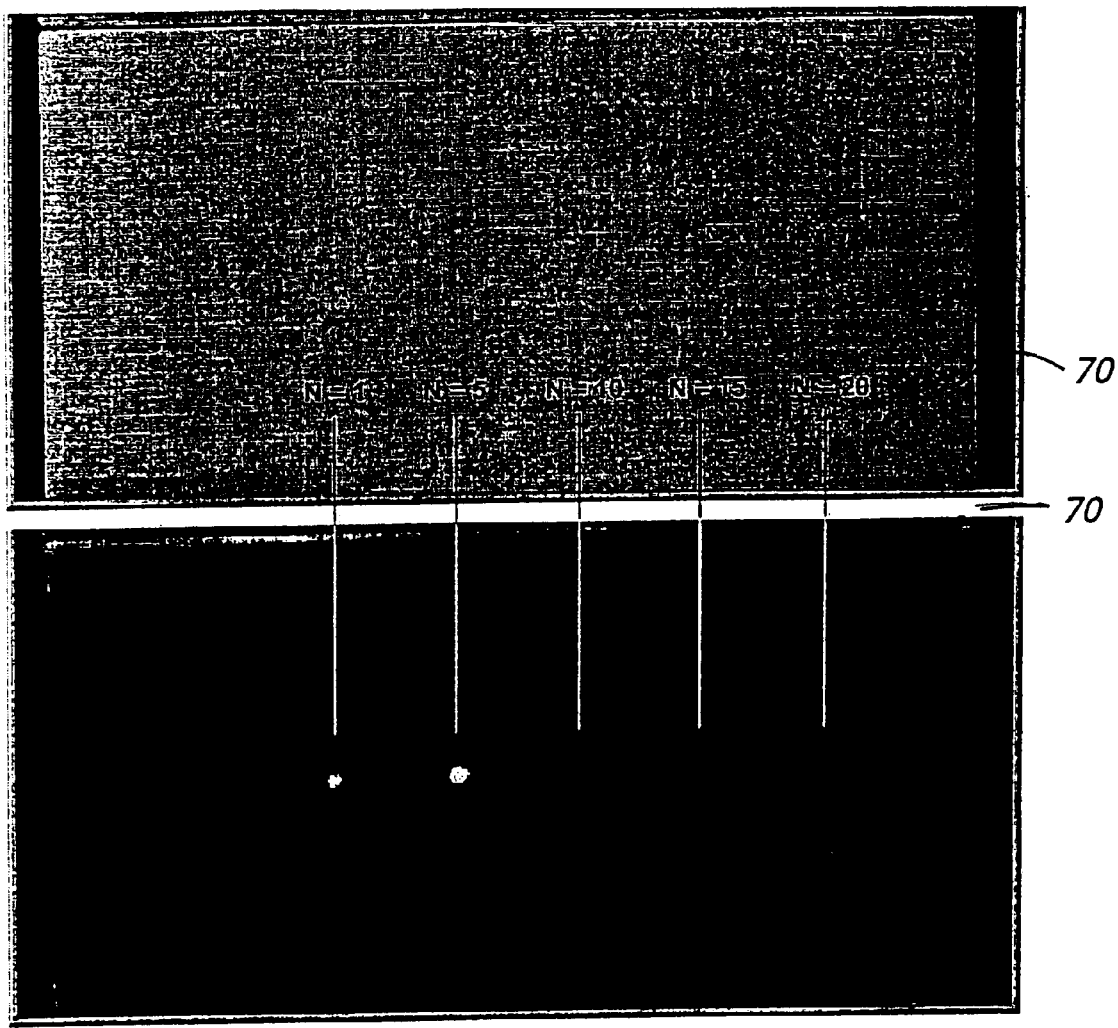
FIG. 9 shows a topography of dimples on a reference workpiece resulting from the beam profiles shown in FIGS. 4–8, and an ultrasonic image of the mid-plane in the reference workpiece.

After the workpiece was suitably taped each location received one laser hit, then the workpiece was re-taped and a second shot sequence was applied for a total of two hits per spot. The second shot at each site was perfectly overlaid with the first. FIG. 9 is a depiction of the dimple topography (top portion of FIG. 9) and the interior view (bottom portion of FIG. 9) of workpiece 70. The dimples resulted from the laser shot sequence shown in FIGS. 4–8: N=1, N=5, N=10, N=15, and N=20. The interior of the workpiece was inspected by C-scan ultrasonic imaging using 50 MHz F/2 and F/3 transducers.

Referring still to FIG. 9, an image of the mid-plane of workpiece 70 was obtained via an ultrasonic inspection method. At the positions corresponding to spots N=1 and N=5, ultrasonic "indications" are observed of the laser warm-up are shown. These "indications" are due to regions of altered acoustic properties which result in a portion of the ultrasonic probe signal being reflected. Furthermore, because of the magnitude of the reflection observed in the fifth shot, it is likely that several shots between the fifth and tenth shot of the laser warm-up sequence would also result in regions of altered acoustic properties indications, and hence exhibit reflections when subjected to ultrasonic inspections.

Figure 10:
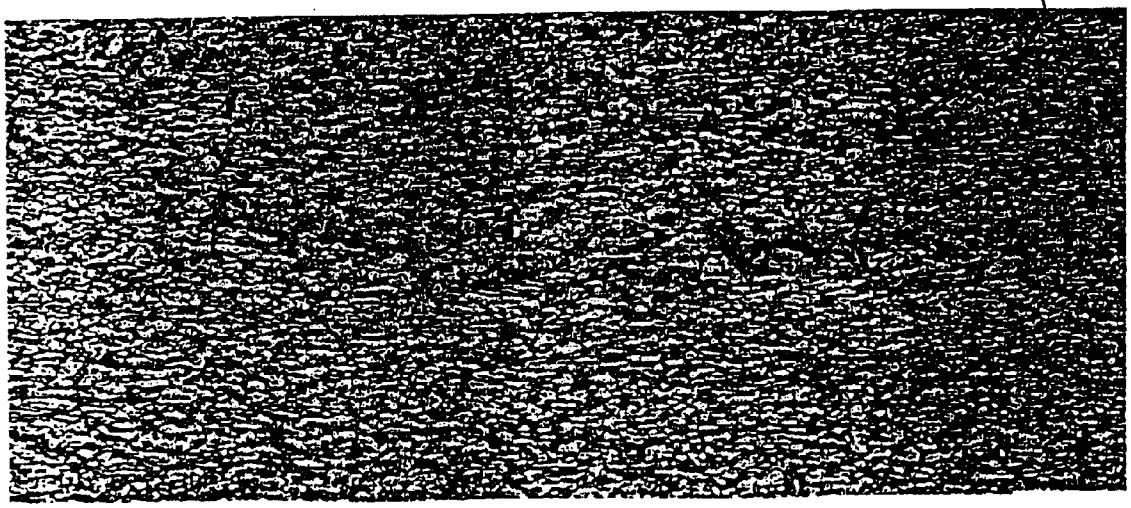
FIG. 10 is a microphotograph of a cross-sectional portion of the reference workpiece of FIG. 9 showing a structural dislocation induced by usage of a laser whose typical spatial energy distribution is represented in FIGS. 3 and 4.

Referring now to FIG. 10, a microphotograph of a metallurgical cross-section of a Titanium alloy fan blade that was laser shock peened using a laser having a spatial beam profile as characterized in FIG. 5 is shown. This cross section confirms that the ultrasonic testing (UT) indication is a microstructural dislocation (crack or tear) at about N=5.

EXAMPLE 2

The above described process was repeated wherein the output energy of the laser device was adjusted to 42 Joules, and the position of the lenses 42 and 44 of FIG. 1 adjusted to result in a laser beam fluence of approximately 150 Joules/cm$^2$ at the target surface. UT inspection revealed indications similar to those noticed with respect to Example 1 under the dimple corresponding to the first shot.

EXAMPLE 3

The above described process was repeated wherein the output energy of the laser device was adjusted to 32 Joules, and the position of the lenses 42 and 44 of FIG. 1 adjusted to result in a laser beam fluence of approximately 200 Joules/cm$^2$ at the target surface. Indications similar to those noticed with respect to Example 1 were observed by UT inspection of the coupon under the dimple corresponding to the first shot.

EXAMPLE 4

The above described process was repeated wherein the output energy of the laser device was adjusted to 22 Joules, and the position of the lenses 42 and 44 of FIG. 1 adjusted to result in a laser beam fluence of approximately 150 Joules/cm² at the target surface. At this laser pulse energy no dislocation defects were found by the UT inspection.

EXAMPLE 5

A similar process is described above with respect to Example 1 was repeated. However, the laser device was allowed to run for an extended period of time and come to a thermal steady-state (e.g., more than ten minutes) before processing the two hit sequence. The laser pulse energy was 50 Joules. Prior to processing of the coupon, the focusing lens was repositioned in order to re-obtain the nominal processing fluence of 150 Joules/cm² averaged over the central seventy percent of spot energy. When the ultrasound images of the coupon were examined, they did not show any evidence of mid-plane dislocation defects. Accordingly, operating the laser device at thermal steady state reduces or eliminates the potential for mid-plane cracking or other microstructural faults.

The mid-plane dislocations or other microstructural faults tend to occur at the center of the annular laser mode. This is typically the low intensity region of the profile. In this area, significant strain gradients in the material may also exist. The microstructural defects occurred during the first five to ten shots of the warm up period for the laser device. This corresponds to the time period when the intensity hole and the spatial symmetry are most distinguished. The first ten shots of the laser device, when the annulus is most distinguished, are highly correlated with the creation of the microstructural dislocation defects.

As described above, a different stress character in the material is produced when the spatial profile, and specifically the annular character of the profile, is strongest. Therefore, to reduce or eliminate the above-described mid-plain structural defects, it is desired that a laser intensity profile similar to shots 10–20 be utilized rather than that of shots 1–5.

The symmetry and amplitude distribution of this pressure impulse determines the resultant axial and transverse strain distributions in the target material. The symmetry and amplitude distribution of the pressure impulse is highly correlated with the fluence distribution from the laser device. Microstructural defects or other physical discontinuities can occur in the target material when the resultant strain distribution exceeds elastic and plastic response thresholds inherent in the material.

The symmetry and amplitude of the laser fluence distribution can be adjusted to generate strain distributions in the target material that reduce or eliminate the induction of structural defects. Furthermore, the symmetry and amplitude of laser fluence distribution can be adjusted at a specific pulse energy and peak power to generate strain distributions in the target material which create predetermined residual stresses (e.g., optimized) for variously defined fatigue strengths (e.g., corresponding to elastic and plastic response thresholds). Reducing the annular portion of the fluence profile reduces or eliminates structural defects. In certain embodiments, the fluence profiles can be sufficiently adjusted to reduce or eliminate microstructural defects by running the device in thermal steady state operation. In other embodiments, the fluence profiles are adjusted by one or more controllers, homogenizers, or a combination thereof. Controllers include, but are not limited to, diffractive optical elements, Fresnel lenses, compound lens systems, laser oscillators, laser oscillator-amplifiers, injection-seeded laser oscillators or oscillator-amplifiers, laser oscillators and oscillator-amplifiers utilizing nonlinear-optical devices such as phase-conjugate reflectors, a combination comprising at least one of the foregoing controllers, and the like. Homogenizers include, but are not limited to, waveguides such as multiple mode waveguides, fiber waveguides, hollow waveguides, a combination comprising at least one of the foregoing waveguides, and the like.

While the invention has been described with reference to one or more embodiments, it will be understood by those skilled in the art that various changes may be made and equivalence may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for laser shock peening a surface of a workpiece comprising:
   generating a laser beam pulse from a laser apparatus, wherein said pulse has a cross-section taken perpendicular to said laser beam and a fluence profile across said cross-section;
   directing said pulse against an area on said surface, and controlling said fluence profile so as to provide control of such process induced defects on the workpiece surface.

2. The method as in claim 1, wherein the step of controlling said fluence profile comprises operating said laser apparatus at a thermal steady state condition.

3. The method as in claim 2, said fluence profile being characterized by an annulus when said laser apparatus is not at the thermal steady state condition, wherein said annulus dissipates while said laser apparatus approaches the thermal steady state condition.

4. The method as in claim 1, wherein a pressure impulse profile is achieved on said surface and said pressure impulse profile is correlated with said fluence profile.

5. The method as in claim 4, wherein an axial strain distribution and a transverse strain distribution are achieved in said surface, said axial strain distribution and said transverse strain distribution being determined by a relationship with said pressure impulse profile.

6. The method as in claim 5, wherein said axial strain distribution and said transverse strain distribution are determined such that said workpiece is not characterized by structural defects.

7. The method as in claim 5, wherein said axial strain distribution and said transverse strain distribution are determined such that said workpiece is characterized by predetermined regions of residual stresses.

8. The method as in claim 1, wherein said fluence profile controlled by a fluence profile controller.

9. The method as in claim 1, wherein said fluence profile controlled by a fluence profile homogenizer.

10. The method as in claim 8, wherein said fluence profile controller is selected from the group consisting of diffractive optical elements, Fresnel lenses, compound lens systems, laser oscillators, laser oscillator-amplifiers, injection-seeded laser oscillators, injection-seeded oscillator-amplifiers, laser oscillators utilizing nonlinear-optical devices and oscillator-amplifiers utilizing nonlinear-optical devices.

11. The method as in claim 9, wherein said fluence profile homogenizer is selected from the group consisting of multiple-mode waveguides, fiber waveguides and hollow waveguides.

12. An apparatus for laser shock peening a surface of a workpiece comprising:
- a laser apparatus generating a laser beam pulse, wherein said pulse has a cross-section taken perpendicular to said laser beam and a fluence profile across said cross-section; and
- at least one optical element for directing said pulse against an area on said surface, wherein said fluence profile is established so as to control process induced defects on the workpiece surface.

13. The apparatus as in claim 12, wherein said fluence profile is achieved by operating said laser apparatus at a thermal steady state condition.

14. The apparatus as in claim 13, said fluence profile being characterized by an annulus when said laser apparatus is not at the thermal steady state condition, wherein said annulus dissipates while said laser apparatus approaches the thermal steady state condition.

15. The apparatus as in claim 12, wherein a pressure impulse profile is achieved on said surface and said pressure impulse profile is correlated with said fluence profile.

16. The apparatus as in claim 15, wherein an axial strain distribution and a transverse strain distribution are achieved in said surface, said axial strain distribution and said transverse strain distribution being determined by a relationship with said pressure impulse profile.

17. The apparatus as in claim 16, wherein said axial strain distribution and said transverse strain distribution are determined such that said workpiece is not characterized by structural defects.

18. The apparatus as in claim 16, wherein said axial strain distribution and said transverse strain distribution are determined such that said workpiece is characterized by predetermined regions of residual stresses.

19. The apparatus as in claim 12, further comprising a fluence profile controller for controlling said fluence profile.

20. The apparatus as in claim 12, further comprising a fluence profile homogenizer for controlling said fluence profile.

21. The apparatus as in claim 19, wherein said fluence profile controller is selected from the group consisting of diffractive optical elements, Fresnel lenses, compound lens systems, laser oscillators, laser oscillator-amplifiers, injection-seeded laser oscillators, injection-seeded oscillator-amplifiers, laser oscillators utilizing nonlinear-optical devices and oscillator-amplifiers utilizing nonlinear-optical devices.

22. The apparatus as in claim 21, wherein said fluence profile homogenizer is selected from the group consisting of multiple-mode waveguides, fiber waveguides and hollow waveguides.

23. An apparatus for laser shock peening a surface of a workpiece comprising:
- laser means for generating a laser beam pulse, wherein said pulse has a cross-section taken perpendicular to said laser beam and a fluence profile across said cross-section; and
- optical means for directing said pulse against an area on said surface,
- wherein said fluence profile is established so as to control process induced defects on the workpiece surface.

24. The apparatus as in claim 23, wherein said fluence profile is achieved by operating said laser means at a thermal steady state condition.

25. The apparatus as in claim 24, said fluence profile being characterized by an annulus when said laser means is not at the thermal steady state condition, wherein said annulus dissipates while said laser means approaches the thermal steady state condition.

26. The apparatus as in claim 23, wherein a pressure impulse profile is achieved on said surface and said pressure impulse profile is correlated with said fluence profile.

27. The apparatus as in claim 26, wherein an axial strain distribution and a transverse strain distribution are achieved in said surface, said axial strain distribution and said transverse strain distribution being determined by a relationship with said pressure impulse profile.

28. The apparatus as in claim 27, wherein said axial strain distribution and said transverse strain distribution are determined such that said workpiece is not characterized by structural defects.

29. The apparatus as in claim 27, wherein said axial strain distribution and said transverse strain distribution are determined such that said workpiece is characterized by predetermined regions of residual stresses.

30. The apparatus as in claim 23, further comprising a controller means for controlling said fluence profile.

31. The apparatus as in claim 23, further comprising a homogenizer means for controlling said fluence profile.

32. The apparatus as in claim 30, wherein said controller means is selected from the group consisting of diffractive optical elements, Fresnel lenses, compound lens systems, laser oscillators, laser oscillator-amplifiers, injection-seeded laser oscillators, injection-seeded oscillator-amplifiers, laser oscillators utilizing nonlinear-optical devices and oscillator-amplifiers utilizing nonlinear-optical devices.

33. The apparatus as in claim 32, wherein said homogenizer means is selected from the group consisting of multiple-mode waveguides, fiber waveguides and hollow waveguides.

* * * * *